United States Patent [19]

Mattus

[11] Patent Number: 5,266,174
[45] Date of Patent: Nov. 30, 1993

[54] PROCESS FOR REDUCING AQUEOUS NITRATE TO AMMONIA

[75] Inventor: Alfred J. Mattus, Oak Ridge, Tenn.

[73] Assignee: Martin Marietta Energy Systems, Inc., Oak Ridge, Tenn.

[21] Appl. No.: 881,860

[22] Filed: May 12, 1992

[51] Int. Cl.[5] .................................................. C25B 1/00
[52] U.S. Cl. .................................................. 204/101
[58] Field of Search ............... 210/638, 639; 204/96, 204/101, 102

[56] References Cited

U.S. PATENT DOCUMENTS

| | | | |
|---|---|---|---|
| 402,848 | 5/1889 | Nahnsen | 210/723 |
| 1,040,379 | 10/1912 | Moest et al. | 204/102 |
| 1,212,062 | 1/1917 | Hunt | 204/96 |
| 1,388,448 | 8/1921 | Blumenberg | 204/102 |
| 2,737,445 | 3/1956 | Nossen | 23/158 |
| 2,809,170 | 10/1957 | Cornelius et al. | 252/465 |
| 3,403,111 | 9/1968 | Colgan et al. | 252/465 |
| 3,542,657 | 11/1970 | Mindler et al. | 204/98 |
| 3,617,579 | 11/1971 | Gunderloy | 210/59 |
| 4,566,986 | 1/1986 | Walmann | 252/175 |
| 4,632,737 | 12/1986 | Mindler | 204/98 |
| 4,642,192 | 5/1986 | Heskett | 210/638 |
| 4,695,447 | 9/1987 | Shultz | 423/659 |
| 4,699,720 | 10/1987 | Harada et al. | 210/762 |
| 4,752,364 | 6/1988 | Dhooge | 204/151 |
| 4,849,190 | 7/1989 | de Castro et al. | 423/124 |
| 4,956,057 | 9/1990 | Stucki et al. | 204/101 |
| 4,990,266 | 2/1991 | Vorlop et al. | 210/748 |

OTHER PUBLICATIONS

"Inorganic and Theoretical Chemistry" by J. Mellor 1947 Longmans, Green and Co. p. 162.

Primary Examiner—Karl Group
Assistant Examiner—A. Wright
Attorney, Agent, or Firm—Edward A. Pennington; Joseph A. Marasco; Harold W. Adams

[57] ABSTRACT

Powdered aluminum is added to a nitrate-containing alkaline, aqueous solution to reduce the nitrate and/or nitrite to ammonia and co-produce a sinterable ceramic product.

20 Claims, 2 Drawing Sheets (REDUCTION CURVE)

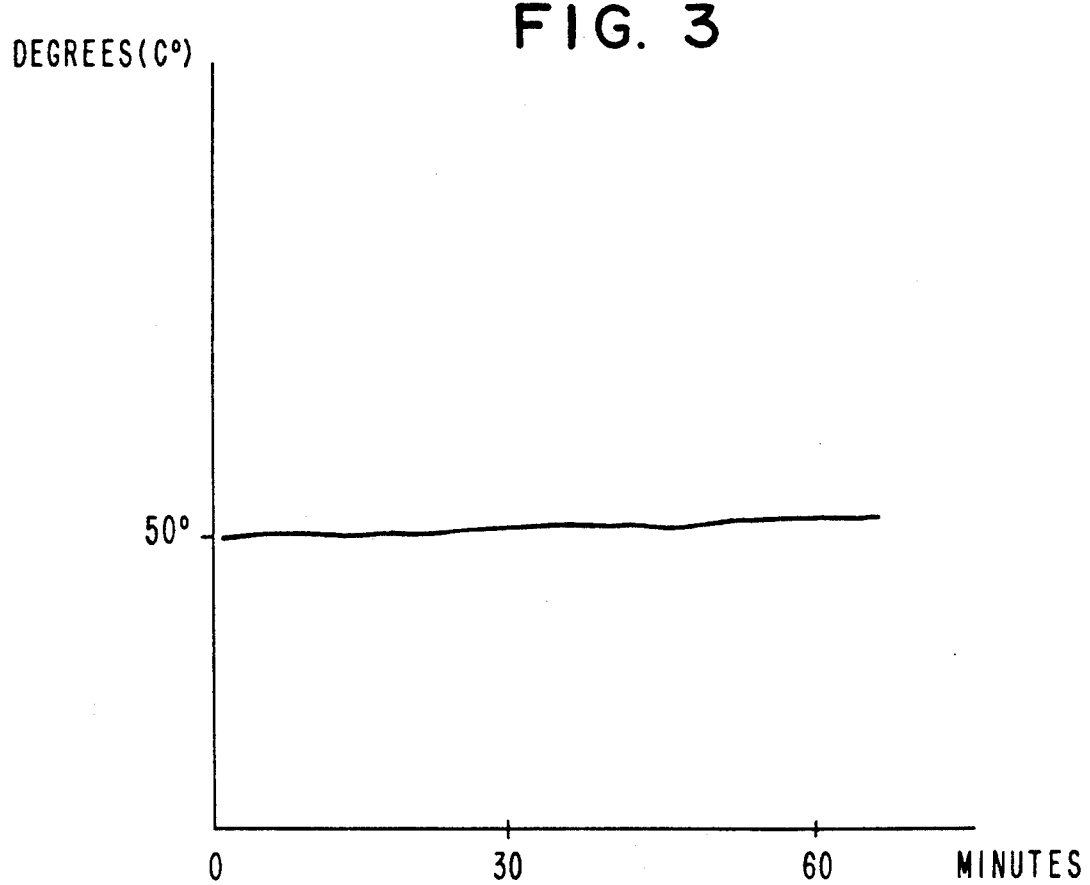

PROCESS FOR REDUCING AQUEOUS NITRATE TO AMMONIA

This invention was made with government support under Contract DE-AC05-84OR21400 awarded by the U.S. Department of Energy to Martin Marietta Energy Systems, Inc. and the Government has certain rights in this invention.

FIELD OF THE INVENTION

The present invention relates generally to the treatment of nitrate-based wastes and more specifically, to a process of reducing nitrate in an aqueous alkaline solution to ammonia while co-producing a sinterable ceramic product.

BACKGROUND OF THE INVENTION

At facilities where the use of nitric acid is widespread, large amounts of alkaline, nitrate-based wastes are generated. Nitrate, as a waste species, is very mobile in the environment and cannot be held up very well in any type of material, including cement-based grout to bitumen. For this reason, prior art abatement methods involving conversion to a gaseous form have included thermal degradation and treatment with chemical reductants at low pH.

The use of the electrolytic cell has shown the most promise of the known methods, except that it creates a new problem in the co-production of large quantities of sodium hydroxide.

U.S. Pat. No. 4,642,192 to Heskett discloses a method of treating fluids, in which waste water containing inorganic species such as chlorine, in the form of hypochlorite or as nitrate, is passed through a bed of metal particles to reduce the chlorine to chloride and the nitrate to a form not mentioned. While the data tables of the patent indicate that nitrate is very slightly reduced, the reduction is inefficient. No disclosure is made of process parameters that would produce an efficient reduction process.

U.S. Pat. No. 4,695,447 to Shutlz discloses a method of destroying inorganic hazardous wastes. Oxides of hazardous metals and non-metals are added to molten aluminum to cause the metals to be either reduced to a metallic state or dissolved in the aluminum or volatilize from the melt, depending on the species. While it is mentioned that nitrate is reduced to nitrogen, it is likely to occur through thermal decomposition since molten aluminum, which is used in the process, has a melting point of 660° C.

U.S. Pat. No. 3,542,657 to Mindler et al discloses a standard electrochemical cell reduction method in which sodium nitrate in alkaline solution is reduced. However, the electrolytic cells reduce nitrate while co-producing vast amounts of sodium hydroxide. Generally, cell operation and stoichiometry requires the co-production of 40 pounds of sodium hydroxide for every 85 pounds of sodium nitrate reduced, according to the following equation:

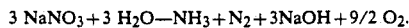

$3\ NaNO_3 + 3\ H_2O \rightarrow NH_3 + N_2 + 3NaOH + 9/2\ O_2$.

Production of sodium hydroxide in these quantities has discouraged use of electrochemical cells.

Another problem with electrolytic cells, in addition to high capital costs, is that the presence of an anode in the circuit can reoxidize reduced chemical species and drop cell efficiency as a result from nearly 100% down to as low as 30%. For example Cr is a very problematic species since, at concentration greater that 1 ppm, the cell efficiency begins to drop rapidly. At 36 ppm Cr, efficiency drops as low as 30% at a very high electrical cost. Additives, such as Bismuth, have been employed to overcome this problem, as disclosed in U.S. Pat. No. 4,632,737 to Mindler.

SUMMARY OF THE INVENTION

An object of the present invention is to provide a process for reducing nitrate to ammonia without co-producing a harmful by-product such as sodium hydroxide.

Another object of the present invention is to provide a process for reducing nitrate to ammonia while producing a useful by-product that is inert and environmentally innocuous.

In a preferred embodiment, a process for treating an aqueous solution containing nitrate-based material includes the steps of:

adjusting the pH of the solution to a value between 9 and 14, but preferably between 11.5 to 13; and admixing aluminum powder to the solution while maintaining the temperature of the solution at a value between 30°-60° C. but preferably between 50°-55° C., over time in amounts sufficient to reduce nitrate in the solution to ammonia and co-produce hydrated alumina.

Preferably, before adding the aluminum powder, the process includes the step of:

adding hydrated alumina to the solution as a reduction catalyst or seed.

Preferably, the ratio of aluminum power to sodium nitrate is between 0.85 to 1 and 1.6 to 1.

BRIEF DESCRIPTION OF THE DRAWINGS

FIG. 3 is a graph showing time verses temperature when a seed material is not pre-mixed in the solution containing nitrate.

DETAILED DESCRIPTION OF THE PREFERRED EMBODIMENTS

Figure 1:
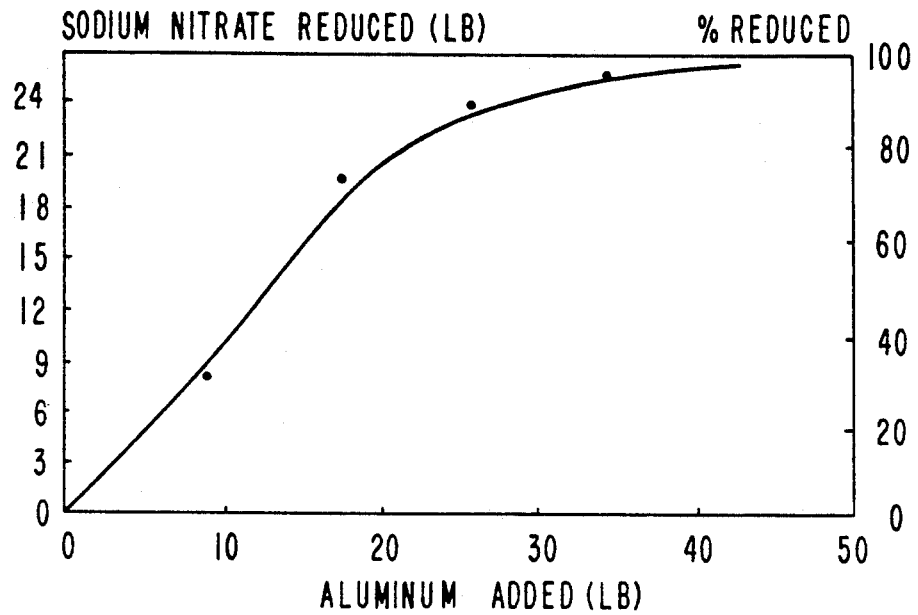
FIG. 1 is a reduction curve showing sodium nitrate reduction based on addition of aluminum.

In the preferred embodiment, electroactive, powdered aluminum metal is used to reduce nitrate to gaseous ammonia in alkaline solution while simultaneously forming a hydrated alumina, such as gibbsite or hydrargillite, which is, upon dehydration, an artificial bauxite. The hydrated alumina, depending on the drying and sintering temperature, looses water and results in a ceramic product. For example, boehmite is formed at 290°-350° C. Corundum is produced if sintered at higher temperatures, i.e., about 900°-1200° C. The dense reaction product is nearly free of both nitrate and sodium hydroxide upon completion of the reaction.

EXAMPLE 1

Aluminum powder is slowly added over several hours to a well stirred solution containing sodium nitrate. The solution is made alkaline, pH 12, using sodium hydroxide. Other suitable base material could be used, such as lime. Prior to adding the aluminum, the solution is preheated by using a heat tape or other suitable heating means in the reactor, to a temperature of 30°-60° C. but preferably between 50° to 55° C. The pH is kept above approximately 9 because at lower pH excessive hydrogen is produced. At pH 12, the protective oxide coating on the aluminum added is dissolved at a useful rate. When the pH exceeds 12, the higher pH values are also useful but the reaction rate increases if the oxide coating is dissolved too rapidly. This creates a situation that risks excess heat generation and more hydrogen production.

The reaction is carried out while maintaining a temperature of the solution between 30° and 60° C., but preferably between 50°-55° C. Above about 60° C. the reaction is too rapid and causes inefficient use of the aluminum due to the limiting rate at which nitrate ion mass transfer occurs in solution. The result is that more hydrogen is produced and less nitrate is reduced. This is most important when the nitrate concentration is low, near the end of the reaction. Additionally, above 60° C. an uncontrolled steam explosion can occur in which the reactor temperature rises to more than 140° C. in a few seconds. The reactor could include cooling means such as cooling coils containing cold ethylene glycol solution. This could be used to hold the temperature in the desired range during the course of the reaction. Below 30° C. the reaction either will not go at all and/or a large amount of hydrogen is formed, resulting in efficiency. However, this is partially dependent upon the nitrate concentration. The optimum temperature was determined to be between about 50° and 55° C. Since the process is self heating, the aluminum is added in amounts and over time such that the preferred temperature range is maintained. The relationship between temperature rise and the addition of aluminum powder depends at least partially on the size of the aluminum powder used, with the smaller size being more reactive. For example, a 230 mesh U.S. Standard powder has a specific surface area of 325 cm$^2$/g and is more reactive than the larger 25-30 mesh aluminum powder having a specific surface area of 37 cm$^2$/g. Aluminum is added at a rate at which the net heat generated and the cooling coils of the reactor remove heat so that the target preferred temperature of 50° C. is maintained. Thus, the rate of addition is a function of how fast heat can be removed to maintain 50° C., the size of the aluminum metal particle, and the pH of the solution. The higher the pH the more reactive the system, up to about pH 14. Also, the more concentrated solutions containing nitrate are even more reactive.

It should also be noted that the aluminum metal does not necessarily have to be added in powdered form and may, for example, be in shot size for bigger systems. Powdered aluminum metal was used in Example 1, and the total time to complete the reduction to ammonia gas was about 6 hours. Example 2 describes a variation of the present invention in which the reduction time is reduced in half to about 3 hours by providing a seeding material which takes away an induction period, as will be described more fully below. Clearly, the aluminum metal can take other forms other than shot or powder. Reactor kinetics will dictate particle size, but spheres are most likely as opposed to aluminum sheets or other geometric shapes.

The aluminum was added in a quantity of about 1.6 lbs for every pound of sodium nitrate in order to effect 97-100% reduction to ammonia. At 100% efficiency, the theoretical amount necessary is 0.85 pound of aluminum per pound of sodium nitrate.

The solution contained 270 g/l sodium nitrate. Other concentrations could have been employed, with better kinetics expected with higher concentrations. Results of the reduction process are shown in FIG. 1. Table I shows nitrate conversion curve data taken from the above process:

TABLE I

| Sodium Nitrate Conversion Curve Data | | | | |
|---|---|---|---|---|
| Aluminum, lb | Sodium nitrate converted, lb | Sodium nitrate converted, % | lb Al/ lb NaNO$_3$ | Efficiency, % |
| 8.6 | 8.2 | 30.2 | 1.1 | 81 |
| 17.2 | 19.7 | 73.0 | 0.9 | 98 |
| 25.8 | 23.8 | 88.2 | 1.1 | 79 |
| 34.4 | 25.5 | 94.4 | 1.4 | 63 |
| 43.0 | 26.2 | 97.0 | 1.6 | 52 |

The final solution contained 8 g/l sodium nitrate, although nitrate concentrates down to a range between 0.0-0.032 g/l have been obtained in other tests. These concentrations are well below current drinking water standards established by the EPA (44 ppm as nitrate or 0.06 g/l as sodium nitrate).

After completion of the reaction, gibbsite is formed as a very dense white solid having a settled volume which is 10% less than the volume of the starting nitrate-based solution at 270 g/l sodium nitrate. Drying the gibbsite at 100° C. forms a hard product with an unconfined compressive strength of 255 psi. This product can be sintered in an oven at about 300° C. for about one hour to form a strong simple ceramic with nonconfined compressive strength of 521 psi. The same ceramic can be made by sintering in the range of 290° to 340° C. X-ray analysis shows the product to be composed of 89 percent boehmite (Al$_2$O$_3$.H$_2$O) with no sodium hydroxide or nitrate along with some not yet fully crystallized hydrated alumina. At this point, artificial Bauxite has been produced. If the sintering temperature is raised high enough, corundum (Al$_2$O$_3$) used in making refractory can be produced. Additionally, a fine active silica or zirconia can be added, or other sources of silica or zirconia, to produce stable minerals such as mullite at higher temperatures using silica. Silica when added with the aluminum powder produces no adverse affects on nitrate reduction efficiency. In fact the abrasive nature of such additives serves to remove oxide coatings on the aluminum and can speed up the reaction. During the addition of active aluminum powder, other additives may be added to produce a final product of the desired type.

The reduction process described above is in effect an electro-reduction reaction in which aluminum metal acts as a cathode to reduce nitrate to ammonia, combined with a chemical reaction before to dissolve oxide on the aluminum powder surface which exposes the metal to the solution. Comparatively, the electro reduction cell method in which some arrangement of anode and cathode are employed with an imposed current is much less desirable, for reasons mentioned above. While 40 pounds of sodium hydroxide will be formed for every 85 pounds of sodium nitrate reduced in standard electrolytic cell processes, according to the present invention between zero and 4 pounds of sodium hydroxide (caustic) will be produced for every 85 pounds of sodium nitrate reduced.

The expected general equation representative of the present process of nitrate reduction with aluminum is as follows:

$$3\ NaNO_3 + 8Al + 18\ H_2O \rightarrow 3\ NH_3 + 8\ Al(OH)_3 + 3\ NaOH \quad (1)$$

The reactor employed is preferably provided with cooling means and mixing means, both of which are generally known and used in the art. Preferably, mixing occurs at 200 rpm, but higher mixing rates may achieve better results due to the benefit of attrition on removing oxides from the aluminum particles. Also, according to the reaction equation stated above, the reaction must be fed water since it reacts with the aluminum and is consumed.

From this expected reaction, as written, it would appear that 40 lb of caustic should be formed for every 85 lb of $NaNO_3$ reduced to ammonia when utilizing aluminum; however, this is not observed after the process of the present invention is employed. Based upon some special properties of aluminum, it is likely that the reason for this is related to some of the general reactions which are as follows:

$$Al + 2\ H_2O \rightarrow H_2 + 2\ OH^- + Al^{+3}e^- \quad (2)$$

$$Al + 3\ H_2O \rightarrow Al(OH)_3 + 3\ H^+ \quad (3)$$

$$Al(OH)_3 + NaOH \rightarrow Na\ AlO_2 + 2H_2O \quad (4)$$

Reaction 2 above is the reaction in which hydrogen gas is formed and contributes to inefficiency, especially during the end of the process when the concentration of nitrate is low and during the induction period if seed material is not added in the reactor. However, hydrolysis of the aluminum III cation which has a high charge to radius ratio, seeks out the oxygen in water and releases hydrogen cations (protons) (reaction 3 above) which usually combine with another proton to form hydrogen gas. Depending upon the prevailing mechanism and kinetics it is possible that these protons are available to neutralize hydroxyl anions in solution or attached to another aluminum cation nearby. Additionally, it is well known that amphoteric aluminum hydroxide is capable of functioning as an acid to neutralize caustic as shown in reaction 4 above. Which of these reactions (reactions 3 or 4) is most responsible for caustic neutralization is still unknown. However, X-ray and acid-base titration of the pulverized boehmite product shows that the large amount of caustic expected is not present.

If reaction 4 above is multiplied by 3 and added to reaction 1, the following equation results:

$$3NANO_3 + 8\ Al + 12\ H_2O \rightarrow 3NH_3 + 5Al(OH)_3 + 3NaAlO_2 \quad (5)$$

The exact stoichiometry is presently unknown, but equation 5 may better represent the described process. A portion of the aluminate formed may further react to form more hydrated alumina.

Aside from the benefits already mentioned in the process disclosed, during the course of the reduction reaction a refractory ceramic is formed. This product can be dried and sintered as a normal ceramic and at the same time results in a net volume reduction. When using a solution containing 270 g/l sodium nitrate, a boehmite product which is 10% lower in volume compared with the starting solution, is formed. It has been found that upon drying the initial product ($Al_2O_3.3H_2O$) at 100° C. and pressing uniaxially at 5,000 psi (as may be done with a "green" ceramic) a further volume reduction of 45% was obtained, for a total reduction of 55% over the original waste solution volume, at this starting nitrate concentration. The pressed product was then sintered at 300° C. for 1 hour forming the harder boehmite product ($Al_2O_3.H_2O$). The volume reductions noted above are of great benefit in the area of waste treatment since typically if such a liquid is immobilized by prior art methods including cement-based grout, a volume increase of 40% to 60% would be realized compared to the present 55% volume reduction. Moreover, the use of techniques such as vibrating and proper drying prior to pressing, as it is done in the ceramic industry, at still higher pressures can conceivably permit further volume reductions.

The present process is based upon a simple principle, which is very reproducible if run under the conditions specified. The process is self-heating and requires no special equipment, although it may require cooling means coupled with temperature control to maintain the temperature below the upper limit. A screw-type auger could be used to feed active metal to a reactor. The alumina-based co-produced product is suitable for microwave drying and sintering. Microwaves couple extremely well with this type of material; in fact, the "skin depth" (microwave penetration depth) is between 10 to 20 feet.

Another unique aspect of the present process is that although an electrochemical reduction is occurring, coupled with chemical dissolution of the aluminum reductant, efficiency of reduction is not affected by the presence of chemical species such as chromium. In a standard electrochemical cell comprised of cathodes and anodes the chromium is reduced at the cathode and reoxidized at the anode, resulting in an endless cycle which substantially lowers efficiency from near 100% down to as low as 30%. Additionally, the Cr VI functions to reoxidize nitrite back to nitrate. This occurs with only a few ppm of chromium in solution. The only way known to minimize, but not completely mitigate the effect of chromium, is through the addition of bismuth to the cell as described in U.S. Pat. No. 4,632,737. In the process described herein, the dissolving aluminum functions as a cathode during dissolution, producing 3 moles of electrons per mole of aluminum metal. In this process, in which simultaneous dissolution and electro-reduction occurs, there is no anode with a large surface area in the circuit to reoxidize species such as chromium. The chromium is reduced to the insoluble Cr III form and precipitates from the solution or reacts with aluminate. Since many nitrate-based wastes contain chromium, this species is of no concern using the present invention.

Most metals and especially non metals react with aluminate to form various insoluble forms of aluminate and/or alumina (also known as beta alumina and represented as $R_2O.11Al_2O_3$ or $RO.6Al_2O_3$ where R is a mono or divalent cation as per Budnikov, P.O, "*The Technology of Ceramics and Refractories*", translated by Scripta Technica, MIT Press, Cambridge, Mass. 1967, at page 200. These species are removed from solution and report to the dense solid phase during the reduction of the nitrate. In this way these species have become a very insoluble part of the ceramic product which may function as its own waste form. Thus, according to the present invention it is possible to remove difficult radio-elements in very low levels, such as Co-60, Tc-99, Am-243, and Cm-244. In the case of chromium the Cr VI is reduced to insoluble Cr III as aforementioned; however, it may also be swept out of solution as an insoluble aluminate.

In both the examples described herein, sodium nitrate was used; however, potassium nitrate and calcium nitrate would also have been expected to receive the same results.

The present invention has the primary utility of reducing nitrate or nitrite in aqueous, alkaline solutions directly and quantitatively to ammonia. In this process many metals are also reduced such as chromium VI which becomes insoluble chromium III since aluminum metal has such an extremely negative (reducing) redox potential. Upon destruction (reduction) of between 97 to 100% of the nitrate in solution, a stable, refractory ceramic solid is obtained. Other metals more positive (oxidizing) than aluminum in alkaline solution theoretically may be reduced to insoluble or less soluble forms as well, as discussed above. Additionally, other active metals which are also powerful reductants in alkaline solution may also serve to effect the reduction of nitrate or nitrite, however less efficiently than aluminum due to the chemical properties of hydrated aluminum and the number of electrons available from aluminum. Other metals which also work are magnesium and zinc. Additionally, additives such as active silica or zirconia may be added during the addition of aluminum powder or shot to produce various alumina-silicates or zirconates with certain desired properties upon heating, such as mullite.

Very large quantities of nitrate-based wastes exist at various facilities in the United States. The nitrate can be converted to ammonia and removed from these wastes thereby eliminating the potential for escape into the environment where nitrate is closely regulated. At the same time a stable ceramic product is formed which could function as a potential waste form with an overall volume reduction based upon the volume of the liquid waste.

It was observed that in the beginning, when powdered aluminum metal is added to a nitrate-containing solution, the reaction of the active metal with the nitrate begins slowly so as to require an induction period. The induction period continues for perhaps three hours until a precipitation of hydrated aluminum (gibbsite) occurs. This is evidenced by a milky white solid. The active reduction time of the nitrate takes about 3 hours also.

Another aspect of the present invention involves speeding up the reaction time or eliminating the induction period by "seeding" the nitrate or nitrite-containing solution with a quantity of hydrated alumina. It was discovered that when a seeding of hydrated alumina was used, the reactions began almost immediately, as below:

EXAMPLE 2

Figure 2:
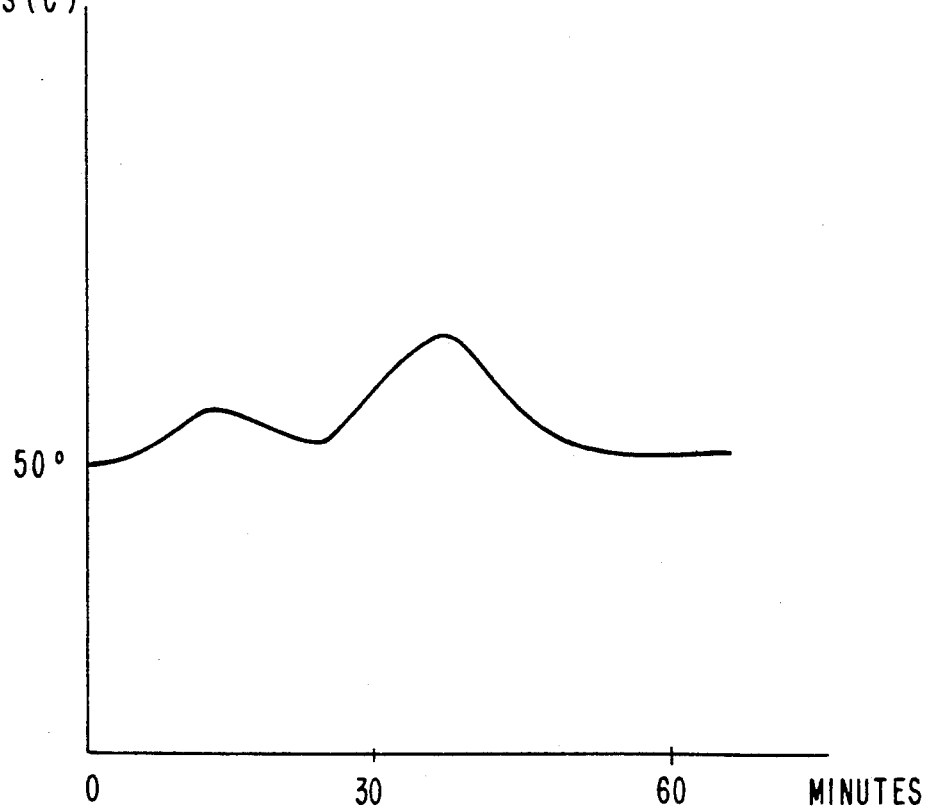
FIG. 2 is a graph showing a bimodal temperature increase when a seed material is pre-mixed in the solution containing nitrate.

A 100 ml aqueous, alkaline solution of sodium nitrate (270 g/l $NaNO_3$ and 1 g/l NaOH) was placed in a reactor, and about 5 grams of gibbsite was added thereto. The solution was preheated using heat tape to about 50° C. 2 grams of aluminum powder was added to the solution. A reaction curve was produced according to FIG. 2, which evidences a bimodal increase in temperature which occurs relatively quickly. FIG. 3 shows the same conditions without any heat rise (or very little) upon adding aluminum without first adding a seed material. FIG. 3 represents the induction period where reactivity is slow and some hydrogen can be co-produced. Comparing FIG. 3 to FIG. 2, it can be clearly seen that the induction period is obviated by using the seed material. Generally, the six hour reduction time noted in Example 1 can be reduced to about 3 hours using seed material.

Various amounts of gibbsite seed were used in subsequent experiments, and it was discovered that as little as 1 gram of hydrated alumina (which can be expressed as gibbsite, $Al_2O_3.3H_2O$, or $Al(OH)_3$) in 100 ml of alkaline sodium nitrate solution at 50° C. significantly enhanced the response of added active metal to reduce nitrate to ammonia gas without a prolonged induction period.

The seed material can be either air-dried or wet product produced during prior operation of the process. Both were found to produce good results. When conducting experiments, the seed material was washed well with water to ensure that soluble sodium hydroxide that may otherwise have been present with the hydrated alumina did not enhance the reactivity.

Generally, it was discovered that increasing the amount of seed added, from 1 to 20 grams per 100 ml of sodium nitrate solution increases the speed of the reaction. At 20 grams, the bimodal function of the reaction changes to a single mode increase, probably due to a mechanism change occurring at this level, which is exhibited by a large, single temperature peak.

According to the present process, mostly insoluble $Al_2O_3.3 H_2O$ is formed. However, during the reduction of the last 10% of nitrate there is the potential for forming some aluminate as well as during the induction period (Note: aluminate is an intermediate species during the whole course of the reduction reaction) when the solution becomes dilute in nitrate. This can be minimized by processing the nitrate (or nitrite also) waste stream in a way in which concentration is maintained high throughout the process due to recycling. This will minimize any co-production of hydrogen gas and maximize efficiency.

Throughout the examples described herein, similar results could be expected with nitrites as were concluded with nitrates.

What is claimed is:

1. A process for reducing alkaline, nitrate-containing waste material in an aqueous solution to ammonia comprising the steps of:
   heating the solution to a temperature between 30°-60° C.;
   admixing a quantity of an alkaline material to raise the pH of the solution to at least 9; and
   admixing a metal having a half cell potential sufficiently more negative than nitrate over time in quantities sufficient to reduce the nitrate-containing waste material to ammonia and co-produce a sinterable ceramic precipitate and to maintain the temperature substantially in the heated range.

2. The process according to claim 1, wherein the step of admixing the quantity of alkaline material comprises admixing a material selected from the group consisting of sodium hydroxide and lime to adjust the pH of the solution to a value in the range of 11.5 to 13.

3. The process according to claim 2, wherein the metal comprises powdered aluminum, and wherein the sinterable ceramic product is hydrated alumina.

4. The process according to claim 1, wherein the step of heating the solution comprises heating the solution to a temperature in the range of 50° to 55° C.

5. The process according to claim 3, wherein the ratio of total quantity of aluminum admixed to total quantity of nitrate-based material, by weight, is about 0.85–1.6 to 1.

6. A process according to claim 1, further comprising adding a quantity of seed material of the same chemical composition as the co-produced ceramic precipitate to the solution prior to admixing the metal.

7. A process according to claim 1, wherein the nitrate-based material is selected from a group consisting of sodium nitrate, potassium nitrate and calcium nitrate.

8. A process for making a ceramic material from a nitrate-containing waste material comprising the steps of:
   heating the solution to a temperature in the range of 30° to 60° C.;
   admixing a quantity of an alkaline material in the solution to raise the pH of the solution to at least 9;
   admixing a metal having a half cell potential sufficiently more negative than nitrate over time in quantities sufficient to reduce the nitrate to ammonia and co-produce a sinterable ceramic precipitate while maintaining the temperature substantially in the range by heat generated by the reduction reaction; and
   drying the ceramic precipitate to form a ceramic material.

9. The process according to claim 8, further comprising, after drying, heating the dried precipitate at a temperature between 290°–340° C. to form a Boehmite ceramic material.

10. The process according to claim 8, wherein the step of admixing the quantity of alkaline material comprises admixing a material selected from the group consisting of sodium hydroxide and lime to adjust the pH of the solution to a value in the range of 11.5 to 13.

11. The process according to claim 8, wherein the metal comprises powdered aluminum, and wherein the sinterable ceramic precipitate is hydrated alumina.

12. The process according to claim 10, wherein the metal comprises powdered aluminum, and wherein the sinterable ceramic precipitate is hydrated alumina.

13. The process according to claim 8, wherein the step of heating the solution comprises heating the solution to a temperature in the range of 50° to 55° C.

14. The process according to claim 12, wherein the ratio of total quantity of aluminum admixed to total quantity of nitrate-based material, by weight, is about 0.85–1.6 to 1.

15. The process according to claim 8, further comprising adding silica to the solution when admixing the metal; and
   sintering the dried ceramic material to produce an alumina silicate ceramic product.

16. The process according to claim 8, further comprising adding zirconia to the solution when admixing the metal; and
   sintering the dried ceramic material to produce an aluminum zirconate ceramic product.

17. The process according to claim 8, further comprising sintering the dried ceramic material at a temperature between about 900°–1200° C. to produce corundum.

18. A process according to claim 8, further comprising adding a quantity of seed material of the same chemical composition as the co-produced ceramic precipitate to the solution prior to admixing the metal.

19. A method of reducing reaction time for a reduction reaction in which aqueous nitrate in a solution is reduced to ammonia by admixing powdered aluminum into the solution, preheated to a range of 30°–60° C. and made alkaline to at least pH 9 by alkaline material, and a sinterable ceramic material is co-produced, comprising:
   admixing a quantity of seed material of the same chemical type as the sinterable ceramic material prior to admixing the powdered aluminum.

20. A method according to claim 19, wherein the alkaline material is selected from the group consisting of sodium hydroxide and lime, the nitrate is selected from the group consisting of potassium nitrate, calcium nitrate, and sodium nitrate, and the co-produced ceramic material and seed material are hydrated alumina.

* * * * *